Figures 1, 2, 3:
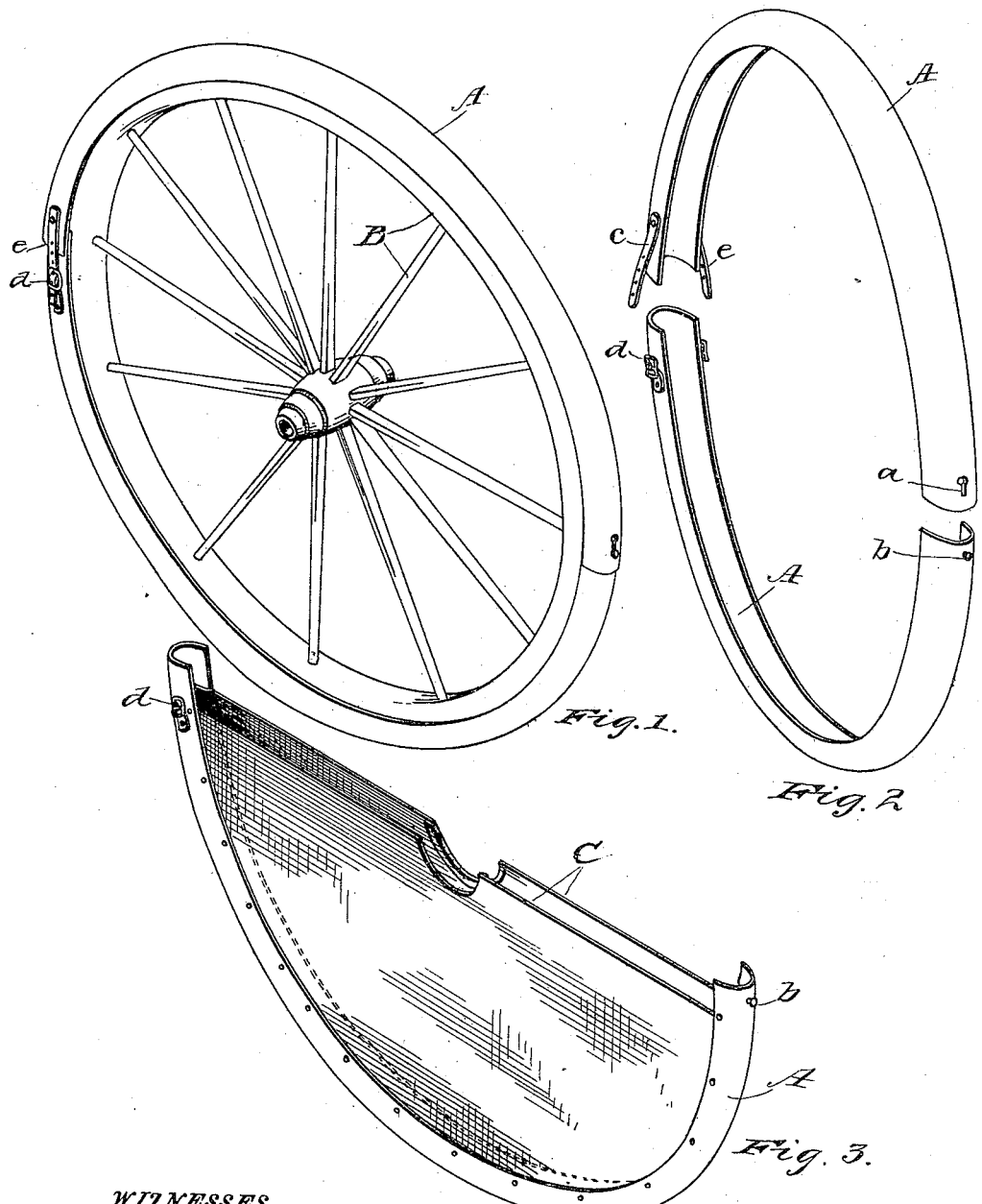

(No Model.)

O. TOOMAY.
COVER FOR PNEUMATIC TIRES.

No. 499,859. Patented June 20, 1893.

WITNESSES
Edw. G. Lane
Mannie Manly

INVENTOR
Oliver Toomay
By M. K. Miller
Attorney

UNITED STATES PATENT OFFICE.

OLIVER TOOMAY, OF CANAL DOVER, OHIO.

COVER FOR PNEUMATIC TIRES.

SPECIFICATION forming part of Letters Patent No. 499,859, dated June 20, 1893.

Application filed February 21, 1893. Serial No. 463,244. (No model.)

*To all whom it may concern:*

Be it known that I, OLIVER TOOMAY, a citizen of the United States, and a resident of Canal Dover, county of Tuscarawas, State of Ohio, have invented a new and useful Improvement in Covers for Pneumatic Wheels, of which the following is a full, clear, and exact description, reference being had to the accompanying drawings, making part of this specification.

My invention relates to an improvement in protectors for pneumatic tires, the object of which is to provide means to prevent the puncture either by accident or by malicious persons of the tire, thereby destroying or interfering with the utility of the tire. This protection is made necessary by the fact that pneumatic tires may be and have been, punctured not only when in transit but upon or at the course, on sulky for speeding horses and on bicycle.

Figure 1, of the accompanying drawings is a perspective of a sulky wheel having a pneumatic tire and cover or protector illustrating my invention. Fig. 2, is a similar view of the protector of the wheel, and Fig. 3, is a similar view of the tire protector and side portions to cover and protect the spokes of the wheel.

Referring to Fig. 2, A represents the tire protector on a sulky wheel B, which may be made of any suitable material preferably of sheet metal, is semi-circular in cross section and may if preferred be made in one continuous piece, or may be divided as shown. When made in two parts for the purpose of securing two of the ends together, as shown in Fig. 1, I have provided in the end portion of one of the parts, an elongated aperture $a$ having an enlarged circular portion at the inside end thereof, and in the corresponding end portion of the other part, an outwardly projected button headed pin $b$, which is passed through the enlarged portion of the slot $a$, and drawn into the narrow portion. The other ends may be secured together in the same way by partially collapsing the tire before putting on the protector, and then re-inflating, or if preferred the end portions may be provided with a strap as $c$ and buckle $d$; when the latter are used, the protector can be put on without collapsing the tire, or other fastening than the strap and buckle may be used if preferred.

In Fig. 3, is shown a side portion or curtain C, provided to cover and protect the spokes of the wheel and may be secured to the inner edges of the protector by rivets, or if preferred, may be secured by buttons or hooks and the free edges of the sides may be secured together by buttons or straps and buckles.

Having thus fully described the nature and object of my invention, what I claim, and desire to secure by Letters Patent, is—

1. The combination with a vehicle wheel having a pneumatic tire, of a removable protector consisting of a sheet metal cover, semi-circular in cross section, extending around said tire and completely concealing the same, substantially as and for the purpose described.

2. The combination with a vehicle wheel having a pneumatic tire of removable protector consisting of two or more sheet metal sections, semi-circular in cross section extending around said tire and completely concealing the same, and means for connecting the ends of said sections together, substantially as and for the purpose specified.

3. The combination with a vehicle wheel having a pneumatic tire, of a removable protector consisting of two or more sheet metal sections, semi-circular in cross section, extending around said tire and completely concealing the same, provided with an elongated aperture $a$, a button headed pin $b$, straps $c$ and buckles $d$, substantially as and for the purpose specified.

4. The combination with a vehicle wheel having an inflated or pneumatic tire, of an annular sheet metal non-pneumatic covering semi-circular in cross section and means for securing said covering on the wheel, substantially as described.

5. The combination with a vehicle wheel having an inflated or pneumatic wheel of a sheet metal covering annular in form, and semi-circular in cross section having side portions C, to cover the central portions of the wheel, substantially as described and for the purpose set forth.

In testimony whereof I have hereunto set my hand this 23d day of January, A. D. 1893.

OLIVER TOOMAY.

Witnesses:
GEO. W. BETSCHER,
W. W. WEBER.